United States Patent [19]

Hagiwara et al.

[11] 4,258,369

[45] Mar. 24, 1981

[54] PEN RECORDER FOR ENABLING A RECORDING PEN TO RECORD CHARACTERS

[75] Inventors: Seisaku Hagiwara, Wakabayashi; Fumio Matsuura, Higashikurume, both of Japan

[73] Assignee: Nihon Kohden Kogyo Co., Ltd., Tokyo, Japan

[21] Appl. No.: 82,614

[22] Filed: Oct. 9, 1979

[51] Int. Cl.³ .............................................. G01D 9/00
[52] U.S. Cl. ...................................... 346/62; 346/33 R
[58] Field of Search ............ 346/62, 23, 33 R, 33 EC, 346/34, 76 R, 61; 343/5 PC, 5 EM; 178/30

[56] References Cited

U.S. PATENT DOCUMENTS

| | | | |
|---|---|---|---|
| 3,754,279 | 8/1973 | Valenti et al. | 346/76 PH |
| 3,803,629 | 4/1974 | Walsh et al. | 346/62 X |
| 4,118,709 | 10/1978 | Cooke et al. | 346/62 X |

*Primary Examiner*—Richard A. Wintercorn
*Attorney, Agent, or Firm*—Kane, Dalsimer, Kane, Sullivan and Kurucz

[57] ABSTRACT

A pen recorder in which a memory storing data at its addresses necessary for constituting a character is scanned, and the signals for the addresses where the data are stored are converted from digital to analog signals before they are supplied to a recording pen for recording the character. A hold circuit is located forwardly or rearwardly of a digital-to-analog converter so as to hold a previous address signal until a stored next address of the data is scanned, so that a recorded character will be legible.

8 Claims, 8 Drawing Figures

FIG. 3a  FIG. 3b
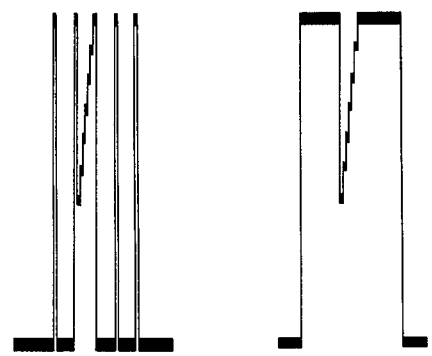
FIG. 4a
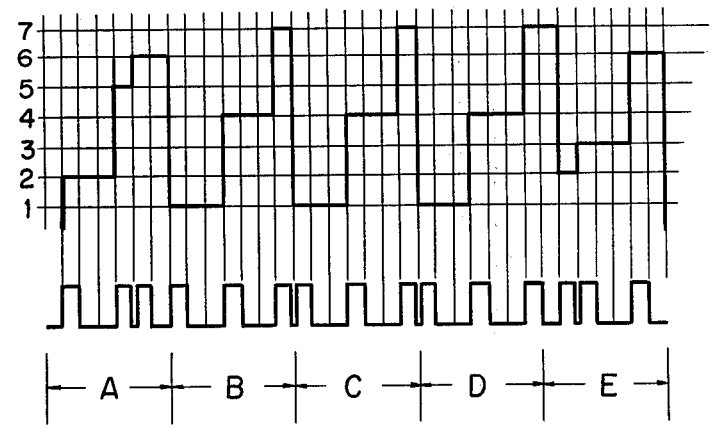
FIG. 4b

PEN RECORDER FOR ENABLING A RECORDING PEN TO RECORD CHARACTERS

FIELD OF THE INVENTION

The present invention relates to a pen recorder for recording continuous signal waveforms with a recording pen, and more particularly to a pen recorder for enabling the recording pen to record characters, symbols and figures (hereinafter merely referred to as "characters") in addition to the continuous signal waveforms.

BACKGROUND OF THE INVENTION

Analog signal waveforms recorded by physiolosical signal recorders such as electrocardiographs are required to be accompanied by certain data such as the names of patients, the dates of recording, the speeds at which the recording sheet is fed, the degrees of sensitivity, or analitic results of somatic signals.

U.S. Pat. No. 3,754,279 discloses a recorder including a theremal print head for recording identifying numerals on a recording sheet at predetermined intervals. A recorder is also well known in which a separate theremal print head is supplied with character and symbol data from a character generator. Since these recorders utilize thermal print heads, however, they are not suitable for use with recording pen using ink. Furthermore, with the separate thermal print head, a space on the recording sheet where signals are to be recorded is large, with the result that the recorders are expensive in manufacture.

A solution to the above shortcomings would be to make the recording pen to record characters by converting digital signals from the character generator into analog signals which are then supplied to the recording pen. Since the recording pen used in the electrocardiograph and the like is always in contact with the recording sheet for continuously recording signals having a frequency up to about 100 Hz, however, it is almost impossible to record characters in dots in response to intermittent signals coming from the character generator. More specifically, each time the date read out of the character generator change from "1" to "0" or from "0" to "1", the recording pen is returned to a base line, in which case, as shown in FIGS. 2b and 3a, unnecesary vertical lines are recorded in addition to dots that constitute characters, thereby making the characters look indefinite. With such an arrangement, it is extremely difficult to distinguish between characters that look similar such as "F" and "P" , or "C" and "O". Additionally, no consideration has been given to the relation between the length and width of characters recorded, resulting in a difficulty in recognizing what the recorded characters are.

SUMMARY OF THE INVENTION

Accordingly, it is an object of the present invention to provide a pen recorder for enabling its recording pen to record legible characters, said pen being always in contact with a recording sheet. This object is attained by providing a hold circuit forwardly or rearwardly of a digital-to-analog converter which converts stored address signals of date into analog signals for being recorded, the hold circuit holding a previous address signal until a next one is supplied.

Another object of the present invention is to provide a pen recorder that can record characters in practical shapes regardless of the speed at which a recording sheet is fed.

These and other objects, features and advantages of the present invention, as well as the invention itself, will become more apparent from the following description of the preferred embodiment of the present invention taken in conjunction with th accompanyng drawings.

BRIEF DESCRIPTION OF THE DRAWINGS

FIG. 3a is a view of a recorded character of "T" as recorded by a recording pen merely driven in response to the output from a character generator;

FIG. 3b is a view of a recorded character of "T" as recorded by a recording pen recorder of the present invention;

FIG. 4a is a view of the waveform of an output signal from a digital-to-analog converter; and FIG. 4b is a view of a train of latch signal pulses.

DESCRIPTION OF THE PREFERRED EMBODIMENTS

Figure 1:
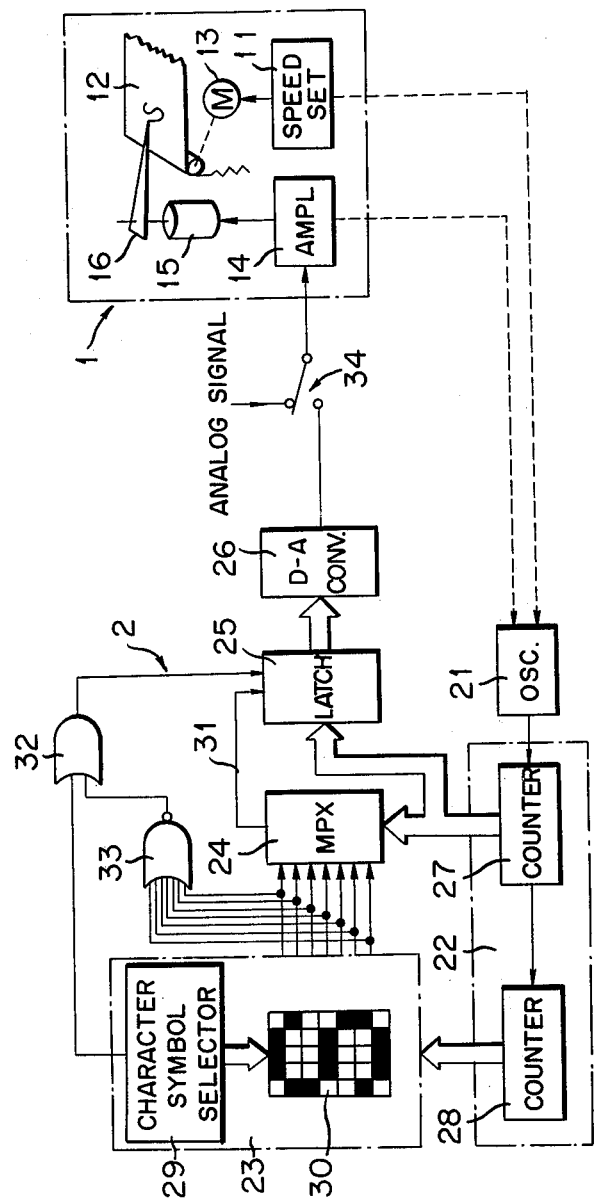
FIG. 1 is a schematic view, partly in block diagram, of a pen recorder according to the present invention.

A pen recorder of the present invention as shown in FIG. 1 generally comprises a recording unit 1 and a character signal generator circuit 2. The recording unit 1 normally records analog signals supplied via a switch 34. When the switch 34 is manually or automatically switched at the starting or the end of recording the analog signals or while the analog signals are being recorded, the recording unit 1 is supplied with the data of characters such as characters, symbols or figures from the character signal generator 2.

The recording unit 1 is composed of a drive mechanism 13 for continuously feeding a recording sheet 12 at a speed determined by a speed setting mechanism 11, an amplifier 14 for amplifying the input signal to determine the recording amplitude thereof, a pen motor 15, and a thermally recording pen 16 attached to the rotational axis of the motor.

Figure 2A:
FIG. 2a is a view of data as stored in a character generator.

The character signal generator circuit 2 comprises a pulse oscillator circuit 21, an address counter 22, a character generator 23, a multiplexer 24, a latch circuit 25, a reset circuit having am OR gate 32 and a NOR gate 33, and a digital-to-analog (D-A) coverter 26. The pulse oscillator circuit 21 produces pulses at a frequency that is manually or automatically variable in response to the speed of travel of the recording sheet and the recording amplitude in the recording unit 1, the produced pulses being counted by the address counter 22. The address counter 22 is a 6-bit binary counter unit including a counter 27 for counting the lower 3 bits and a counter 28 for counting the upper 3 bits. The output of the counter 27 is supplied to the multiplexer 24 and the latch circuit 25, and the output of the counter 28 is supplied to the character generator 23. The character symbol selector 29 and a read-only memory (ROM) 30 for storing the data of characters. The data stored in the ROM 30 are expresses in a 7×5 matrix as shown in FIG. 2a, the data "1" being stored in addresses necessary for forming characters and the data "0" being in other addresses.

Each time the multiplexer 24 receives an address signal from the counter 27 for repeatedly counting the lower 3 bits (1-7 in decimal code), the multiplexer 24 scans the addreses of a character stored in the ROM 30 in the direction of columns. The multiplexer 24 produces an output on a line 31 for use as a latch signal, only when it reads out the data of "1". The counter 28 for counting the upper 3 bits produces a signal for scanning a character stored in the ROM 30 in the direction of rows. The sequence of scanning of a character is expressed as A1-A7, B1-B7, . . . , E1-E7 in terms of address characters attached to the frame shown in FIG. 2a.

The latch circuit 25 functions as a digital hold circuit for holding the address signal from the counter 27 and is constituted by a commercially available IC register having latch and reset terminals. The latch circuit 25 is supplied at all times with the address signal from the counter 27, and holds a previous address signal until it receives a latch signal via the line 31. The holding in the latch circuit 25 is released by a reset signal supplied via the OR gate 32 from the character symbol selector 29 at the end of recording of each character, or from the NOR gate 33 when the data in a column in the matrix shown in FIG. 2a become all "0". Therefore, the NOR gate 33 resets the latch circuit 25 when the data in any column in the matrix (the input data to the multiplexer 24) are all "0", even while the matrix is being scanned. With this arrangement, adverse effects due to the holding of address signals are prevented. For example, confusion between ",". and "V", or between " . . . " and "—" is prevented from occurring.

The D-A converter 26 converts the address signals held in the latch circuit 25 into analog signals, which are then supplied to the amplifier 14 as signals for driving the recording pen 16.

The character symbol selector 29 indicates to the ROM 30 predetermined characters such as "DATE" or "NO." and then characters determined by the keyboard, based on the output from the counter 28, each time the recording of a character is finished. The character symbol selector 29 generates a reset signal for the latch circuit 25 after the recording of each character.

For the recording of a character "S", the pen recorder of the present invention operates as follows: After the data for the character "S" stored in the ROM 30 are designated by the character symbol selector 29 in the character generator 23, the counter 27 starts counting the output from the pulse oscillator circuit 21 to enable the multiplexer 24 to read out the address A1 in the matrix in FIG. 2a. In this case, the read-out signal is "0", and the latch circuit and the D-A converter 26 remains inoperated, allowing the recording pen 16 to stay at its base line.

When the counter 27 counts a next pulse, the multiplexer 24 reads out the address A2 in the matrix in FIG. 2a, which is the data "1" causing a latch signal to appear on the line 31. As a result, the latch circuit 25 holds a signal that corresponds to the A2 address, and is converted by the D-A converter 26 into an analog signal, which is then supplied to the recording unit 1. The recording pen 16 is then moved from the base line, two steps up to a position corresponding to the A2 address.

The data for the A3 and A4 addresses for the character "S" stored in the ROM 30 are "0", and hence no latch signal is produced for such addresses. Thus, the recording pen 16 stays in the position corresponding to the A2 address for continuous recording.

When the A5 address is read out, a latch signal is produced again, and the latch circuit 25 holds a signal corresponding to the A5 address for the A2 address, enabling D-A converter 26 to produce the corresponding analog output. The recording pen 16 then moves three steps up to the A5 address position. Upon counting up the A7 address, the counter 27 is cleared, and at the same time gives a pulse to the counter 28, enabling the ROM 30 to be scanned in the column of B. Then, the foregoing operation will be repeated from the B1 address.

FIG. 4a shows the output waveform of a signal for driving the recording pen 16, that is the output waveform from the D-A converter 26. The ordinate is graduated with signal levels corresponding to the column addresses 1-7, and the abscissa is graduated with the periods of oscillation in the pulse oscillator circuit 21, on the read-out timing by the ROM 30.

FIG. 4b shows intervals of time at which latch signals are generated and fed via the line 31, wherein the characters A through E appearing below the pulses indicate the row addresses in FIG. 2a.

A character "S" as recorded in accordance with the above operation includes substantially vertical lines (FIG. 2c) which are slightly inclined due to continuous movement of the recording sheet 12. However, since the recording pen 16 remains stopped at a previous dot position when there is no dot to be recorded in a successive column, horizontal lines are thicker, thereby making the resulting character look clearly.

FIG. 3b shows a character "T" as similarly recorded in accordance with the pen recorder of the present invention.

The pen recorder according to the present invention is much more advantageous than the one having no latch circuit, in which characters recorded thereby have more vertical lines due to the return to the base line of the recording pen each time the pen records a dot (FIGS. 2b and 3a), so that the resulting characters become much less definite.

To make a character more definite and readable, it is also important to take the overall shape of the character into consideration. One of the important elements which are conducive to readable character shapes is a ratio k of the length to the width of a character.

It has been found through numerous experiments that such ratio k is given by the following formula (1), and an optimum value of the ratio is in the range from 0.5 through 3.

$$k = (A/V) \cdot (f/n) \tag{1}$$

where
  A is a vertical length (mm) of a character that is adjusted by the amplifier 14,
  V is a speed of travel of the recording sheet that is determined by the speed-setting mechanism 11,
  n is the number of all addresses for a single character that is stored in the character generator 23, and
  f is the oscillating frequency in the pulse oscillator circuit 21.

From the above formula (1), the oscillating frequency in the pulse oscillator circuit 21 which is suitable for recording readable character can be obtained.

$$f = k \cdot n \cdot V/A \tag{2}$$

For example, when a character generator with 35 bits for a single character is used and a character with a length of 7 (mm) and a width of 5 (mm) is to be recorded on a recording sheet which travels at 2.5 (mm/sec), the optimum frequency will be 24.5 Hz since k=1.4, n=35, A=5, and V=2.5.

Therefore, readable characters can be recorded by determining the frequency in the pulse oscillator circuit 21 through manual or automatic operation, taking into consideration the speed of travel of the recording sheet determined by the speed-setting mechanism 11 and the length of a character to be recorded determined by the amplifier 14.

The frequency f of the pulse oscillator circuit 21 which is determined by the formula (2) should be within the range of frequency characteristics of the recording unit 1, because the frequency f defines the speed of read-out at the character generator 23 and the frequency of an input signal to the pen motor 15.

Figures 2B, 2C:
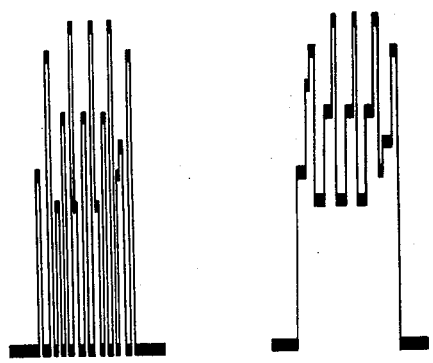
FIG. 2b is a view of a recorded character of "S" as recorded by a recording pen merely driven in response to the output from a character generator.
FIG. 2c is a view of a recorded character of "S" as recorded by a pen recorder of the present invention.

In the foregoing operation, the sequency of scanning to read out the ROM 30 has been A1–A7, B1–B7 and so forth in terms of the address characters in FIG. 2a. However, the sequency may be A1–A7, B7–B1, C1–C7, ..., E1–E7 by using an up-down counter for the counter 27 (FIG. 1). With such a modification, characters of more uniform density result because the phenomenon that the horizontal lines at the lowermost addresses A1, B1, C1..., e.g. when recording "S", become thicker than the horizontal lines at the uppermost addresses A7, B7, C7..., as illustration in FIG. 2c, is reduced.

Although in the illustrated embodiment the character generator 23 constituted by the character symbol selector 29 and the ROM 30 is used as a memory, the present invention is not limited to such an arrangement, but any other memory can be used in which when an character to be recorded with the recording pen is broken down in a matrix, portions to be recorded in dots and portions not to be recorded are previously stored, and then the storages are sequentially scanned and read out to reproduce characters. For example, a RAM having relatively large capacity can be used for clearly recording something like a graph of data analyses with no unnecessary vertical lines.

Furthermore, the hold circuit of the present invention may be constituted by an analog circuit located rearwardly of the D-A converter 26, in which case e.g. the latch circuit 25 in FIG. 1 is dispensed with, and the counter 27 produces an output to the D-A converter 26 wherein it is directly converted into an analog signal, when the data "1" is generated on the line 31, there being connected a hold circuit using a capacitor to the D-A converter 26. The hold circuit is arranged so as to be discharged momentarily by a reset signal, with its output being supplied to the amplifier 14.

The present invention is also applicable to a multipen recoder in which the recording pen for recording signal waveforms can be used for recording various necessary data such as the name of the patient, the date of the recording, the speed of travel of the recording sheet, the degree of sensitivity, and the analitic results of the signal waveforms, so that a plurality of the waveforms and their associated data can be compared at a glance. Also, there never occurs a limitation on a space for the waveforms to be recorded, such limitation resulting from independent recording of multiple data. Furthermore, the present invention is applied not only to a thermally recording pen, but also to a pen recording with ink.

It should be understood that various modifications and alterations may be made without departing from the scope of the appended claims.

What is claimed is:

1. A pen recorder comprising:
   (a) a recording unit having a recording pen;
   (b) a memory for storing data that are effective to constitute characters;
   (c) a counter for generating address signals that scan the addresses of the stored data sequentially;
   (d) a digital-to-analog converter for converting the stored address signals of the data into analog signals for being recorded by said recording pen.
   (e) a pulse oscillator circuit for generating a train of pulses to be counted by said counter; and
   (f) a hold circuit for holding a previous address signal until a stored next address of the data is scanned.

2. A pen recorder according to claim 1, wherein the oscillating frequency in said pulse oscillator circuit is determined in response to the speed of travel of a recording sheet and the vertical length of a character to be recorded.

3. A pen recorder according to claim 1 or 2, said pulse oscillator circuit comprising a circuit for generating pulses having oscillating frequency given by the following formula:

$$f = k \cdot n \cdot V/A$$

wherein
f is an oscillating frequency,
k is a ratio of the length to the width of a character to be recorded (optimum ratio is 0.5–3)
n is the number of all addresses that constitute a single character in the memory,
V is the speed of travel of the recording sheet (mm/sec), and
A is the length of the character to be recorded (mm).

4. A pen recorder according to claim 1, said hold circuit comprising a digital circuit located forwardly of said digital-to-analog converter.

5. A pen recorder according to claim 1, said hold circuit comprising an analog circuit located rearwardly of said digital-to-analog converter.

6. A pen recorder according to claims 1, 4 or 5, wherein said hold circuit is reset when the data in a column in a matrix of a character in the memory are all "0".

7. A pen recorder according to claim 1, said recording pen being a pen recording with ink.

8. A pen recorder according to claim 1, said recording pen being a thermally recording pen.

* * * * *